United States Patent [19]
Hong

[11] Patent Number: 5,457,546
[45] Date of Patent: Oct. 10, 1995

[54] VIDEO SIGNAL TRANSIENT EDGE ENHANCING DEVICE AND METHOD FOR IMAGE PROCESSING SYSTEM

[75] Inventor: Sung H. Hong, Seoul, Rep. of Korea

[73] Assignee: Goldstar Co., Ltd., Seoul, Rep. of Korea

[21] Appl. No.: 46,296

[22] Filed: Apr. 15, 1993

[30] Foreign Application Priority Data

Apr. 17, 1992 [KR] Rep. of Korea .................... 92-6436

[51] Int. Cl.⁶ .................................................. H04N 1/40
[52] U.S. Cl. .......................................... 358/447; 348/625
[58] Field of Search .................................. 358/447, 445, 358/463, 464, 160, 96, 36, 37, 166, 167, 162; 382/54, 55; 348/625, 627, 606, 584

[56] References Cited

U.S. PATENT DOCUMENTS

| | | | |
|---|---|---|---|
| 4,414,564 | 11/1983 | Hitchcock | 348/625 |
| 4,499,493 | 2/1985 | Nishimura | 358/463 |
| 4,532,548 | 7/1985 | Zwirn | 348/625 |
| 4,541,014 | 9/1985 | Yagi | 348/625 |
| 4,739,395 | 4/1988 | Johanndeiter | 358/37 |
| 4,918,528 | 4/1990 | Oohashi | 348/625 |
| 5,031,227 | 6/1991 | Raasch et al. | 382/22 |
| 5,151,787 | 9/1992 | Park | 348/625 |

Primary Examiner—Edward L. Coles, Sr.
Assistant Examiner—Madeleine Nguyen
Attorney, Agent, or Firm—Pennie & Edmonds

[57] ABSTRACT

A video signal transient edge enhancing device and method which can clearly display an image by properly enhancing transient edges of video signals having different frequency bands according to the respective frequency bands. The device of the present invention comprises a plurality of transient edge enhancers for enhancing transient edges by respective proper bandwidths with respect to a plurality of input video signals having different frequency bands, and an enhancer selector for selecting one enhancer among the transient edge enhancers according to a selection control signal determined according to bands of the input video signals and outputting a video signal enhanced by the selected enhancer. According to the present invention, widths of the transient edges, which are different from one another according to the frequency bands of the input video signals, are detected and a proper enhancer is selected according to the transient width detecting information, thereby enhancing the corresponding video signal. Accordingly, accurate enhancement for transition edges can be performed regardless of the type of input video signal and noise components can be removed. Also, since the transient edge enhancing process is not performed with respect to a sharp transient edge, a clear image suitable for human visual characteristics can be obtained.

13 Claims, 9 Drawing Sheets

F I G. 7A  INPUT VIDEO SIGNAL

F I G. 7B  DIFFERENCE SIGNAL

F I G. 7C  TRANSIENT EDGE DETECTION SIGNAL

F I G. 7D  NOISE DETECTION SIGNAL

F I G. 7E  ENHANCED VIDEO SIGNAL

VIDEO SIGNAL TRANSIENT EDGE ENHANCING DEVICE AND METHOD FOR IMAGE PROCESSING SYSTEM

BACKGROUND OF THE INVENTION

The present invention relates to a video signal transient edge enhancing device and method for an image processing system, and more particularly to a video signal transient edge enhancing device and method, which can obtain a clear image in an enhanced edge by properly enhancing the transient edges of video signals having different frequency bands such as TV, VCR, S-VHS, etc., according to the respective frequency bands.

Figure 1:
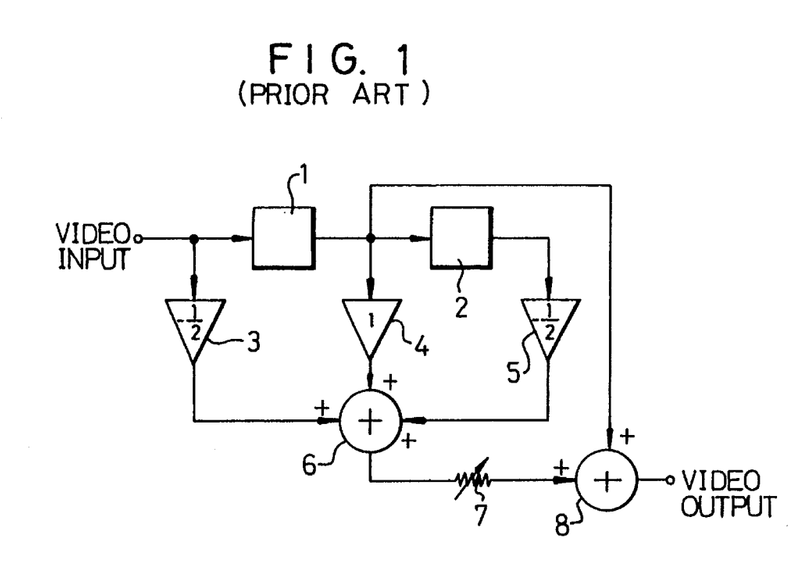
FIG. 1 is a block diagram showing a conventional video signal transient edge enhancing device.

A video signal transient edge enhancing device enables a clear image picture to be watched by enhancing an input video signal, i.e., edge components of luminance signal or chrominance signal which is separated from a composite video signal. Referring to FIG. 1, which shows a conventional video signal transient edge enhancing device, the conventional enhancing device comprises delay elements 1 and 2 for delaying an input video signal for a predetermined time, amplifiers 3, 4 and 5 for respectively amplifying the video signal and the video signals delayed by the respective delay elements, an adder 6 for adding the amplified video signals, an attenuator 7 for adjusting an enhanced level of the added video signal, and an adder 8 for outputting a finally enhanced video signal by adding the attenuated video signal and the video signal delayed by the delay element 1.

The inputted video signal is supplied to adder 6 via -½ amplifier 3 and also is inputted to delay element 1 to be delayed for a predetermined time. The output of delay element 1 is inputted to adder 8 and the other delay element 2, and at the same time, is amplified by amplifier 4 to be supplied to adder 6. Also, the video signal delayed for a predetermined time by delay element 2 is amplified by -½ amplifier 5, and then is inputted to adder 6.

Here, if the delay time of delay elements 1 and 2 is a 1-line period, the device operates as a circuit for enhancing the input video signal in a vertical direction, and if it is a 1-sample period, the device operates as a circuit for enhancing the input video signal in a horizontal direction. The signal delay, amplification and addition operations, as described above, are a set of differential processes, and as a result of the differential processes, overshoot and undershoot are performed at transient edges (i.e., rising and falling edges) of the input video signal. Accordingly, the edge components within an image are enhanced, and the enhanced degree (level) of the enhanced signal is then adjusted by attenuator 7. The enhanced signal is added to the video signal passed through delay element 1 by adder 8, thereby outputting a video signal having enhanced transient edges.

For instance, since the luminance of an NTSC TV signal has a bandwidth of 4.2 MHz and its edge components correspond to about 2 to 3.5 MHz band, a clear image is reproduced by producing a video signal having enhanced transient edges, using a differential circuit (or peaking circuit) for enhancing the frequency band component.

Figure 3:
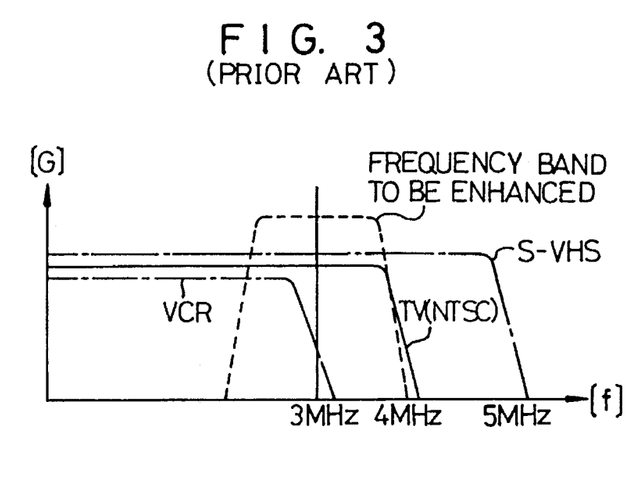
FIG. 3 is a graph showing the VCR, TV and S-VHS video signal bandwidths and the frequency band enhanced by a conventional transient edge enhancing device.
Figure 4:
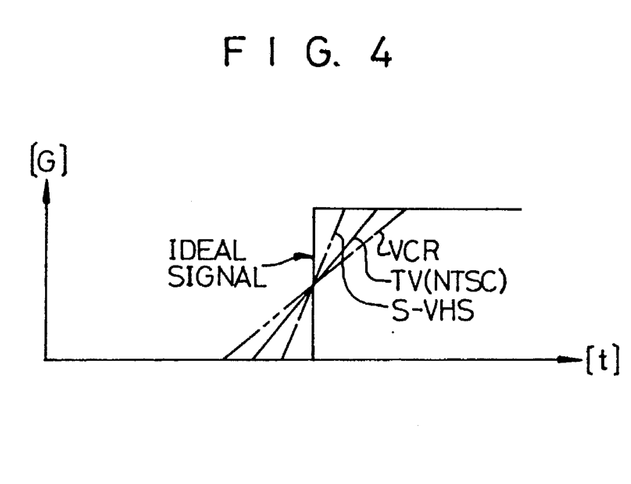
FIG. 4 is a graph explaining transient levels of VCR, TV and S-VHS video signals.

However, a current TV processes as an input signal a VCR signal or an S-VHS signal as well as a TV signal transmitted from a broadcasting station. The bandwidths and transient levels of the respective video signals such as VCR, TV(NTSC), S-VHS, etc., are different. As shown in FIGS. 3 and 4, the video signals have different frequency bands according to their signal processing types (or circuits) and thus have different frequency bands of transient edge in the respective signals. Accordingly, it is required that the transient edge be accurately enhanced corresponding to the respective frequency bands.

Figure 2:
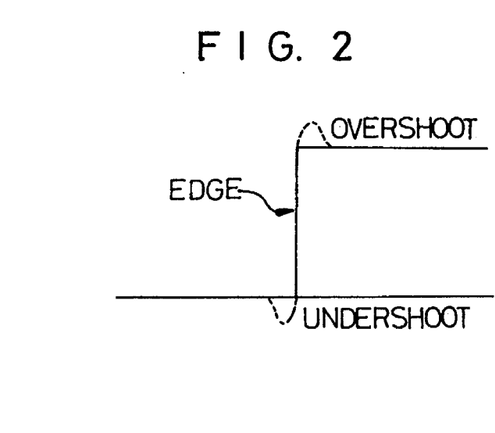
FIG. 2 is a view explaining human visual characteristics in a sharp transient edge.

However, in the conventional video signal transient edge enhancing device for use in processing a TV (NTSC) signal having a bandwidth of about 4 MHz as shown in FIG. 3, the frequency region to be enhanced is 2 to 4 MHz. Accordingly, if this enhancing device is applied to a VCR signal having a bandwidth of about 3 MHz or an S-VHS signal having a bandwidth of about 5 MHz, frequency band excluding the edge region is enhanced, thereby reproducing an unnatural and low quality image. That is, when it is applied in the VCR signal, high frequency signal is enhanced, thereby outputting an image having much noise, and when it is applied to the S-VHS signal, frequency signal being lower than the edge region is also enhanced, thereby outputting an unnatural image. When an ideal signal is inputted as shown in FIG. 4, the widths of the respective transient edges of TV, VCR, and S-VHS signals increase because of limited bandwidth. This means that there is a difference in the frequencies of edge regions of the respective video signals. Also, since human vision has a feeling of enhanced transient edge as if overshoot or undershoot is performed in the sharp transient edge, as shown in FIG. 2, it can be known that additional enhancement of the transient edge is not needed.

SUMMARY OF THE INVENTION

It is an object of the present invention to provide a video signal transient edge enhancing device and method for an image processing system, which can obtain a clear image regardless of the type of input video signal by enhancing the transient edges of video signals having different frequency bands according to the respective frequency bands.

It is another object of the present invention to provide a video signal transient edge enhancing device and method for an image processing system, which can obtain a high quality image by removing noise components in the enhancement process of transient edge.

It is still another object of the present invention to provide a video signal transient edge enhancing device and method for an image processing system, which is suitable for human visual characteristics by performing no transient edge enhancing process in a sharp transient edge.

To achieve these objects, the present invention provides a video signal transient edge enhancing device for an image processing system, which comprises:

at least two transient edge enhancers for performing band enhancement of transition starting and ending positions of each video signal by each proper bandwidth with respect to input video signals having different frequency bands to be enhanced;

selection control signal generating means for generating a selection control signal determined according to bands of the input video signals; and enhancer selecting means for selecting one enhancer among the transient edge enhancers by being switch-controlled according to the selection control signal outputted from the selection control signal generating means and outputting a video signal enhanced by the selected enhancer.

To achieve these objects, the present invention also provides a video signal transient edge enhancing method for an image processing system which comprises the steps of:

a) performing a band-pass-filtering process for each corresponding frequency band with respect to input video signals having different frequency bands where enhancement process of transient edge will be performed;

b) detecting rising and falling transient edges, noise region, and normal video signal region within each filtered video signal;

c) selectively outputting a video signal having enhanced rising and falling edges in rising and falling transient edges of video signal, an average video signal of adjacent two pixels in noise region, and an original video signal in a normal signal region, using the respective detected regions as region detection information; and d) selectively outputting one signal among video signals enhanced through the respective steps, according to bands of respective input video signals.

BRIEF DESCRIPTION OF THE DRAWINGS

The above objects and other advantages of the present invention will become more apparent by describing the preferred embodiments of the present invention with reference to the attached drawings, in which.

DETAILED DESCRIPTION OF THE PREFERRED EMBODIMENTS

Figure 5:
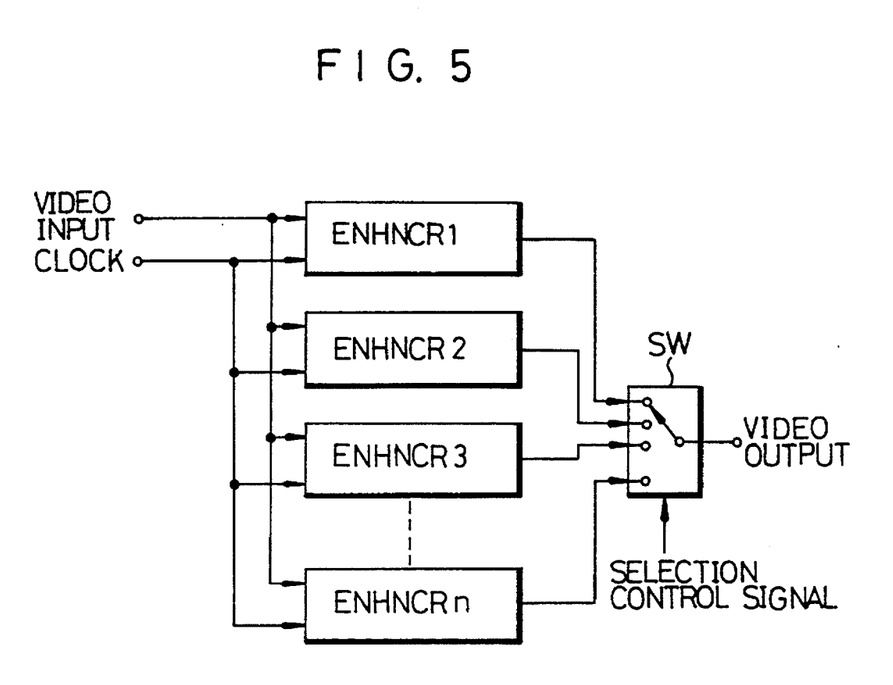
FIG. 5 is a schematic block diagram of a transient edge enhancing device according to the present invention.

Referring to FIG. 5, the transient edge enhancing device of the present invention comprises a plurality of transient edge enhancers ENHNCR1 through ENHNCRn for performing band enhancement of transition starting and ending positions of each video signal by each proper bandwidth with respect to input video signals having different frequency bands where enhancement of transient edge will be performed, and an enhancer selecting means SW for selecting one enhancer among the transient edge enhancers ENHNCR1 through ENHNCRn by being switch-controlled in response to a control signal determined according to bands of input video signals and outputting a video signal enhanced by the selected enhancer.

Frequency bands enhanced by the transient edge enhancers ENHNCR1 through ENHNCRn are set to be different according to bands of input video signals. For example, first transient edge enhancer ENHNCR1 performs frequency band enhancement of edge portion with respect to an S-VHS signal having a frequency band of about 50 MHz. Second transient edge enhancer ENHNCR2 enhances the frequency band of edge portion with respect to a TV (NTSC) signal having a frequency band of about 4 MHz, and third transient edge enhancer ENHNCR3 enhances a frequency band of edge portion with respect to a VCR signal having a frequency band of about 3 MHz. Enhancer selecting means SW selects one among transient edge enhancers ENHNCR1 through ENHNCRn according to an enhancer selection control signal inputted thereto and outputs a video signal enhanced by the selected transient edge enhancer.

The enhancer selection control signal is a control signal having a given form of control signal predefined according to S-VHS, TV or VCR signal as shown in the example, and selection control signal generating means can be an S-VHS/TV/VCR mode selection switch, or a system controller for outputting a corresponding selection control signal according to the result of determination of input video signal.

Accordingly, a video signal whose edge portion is optimally enhanced by a transient edge enhancer suitable for a corresponding input video signal band is obtained, so that a high quality and high definition image can be displayed.

Figure 6:
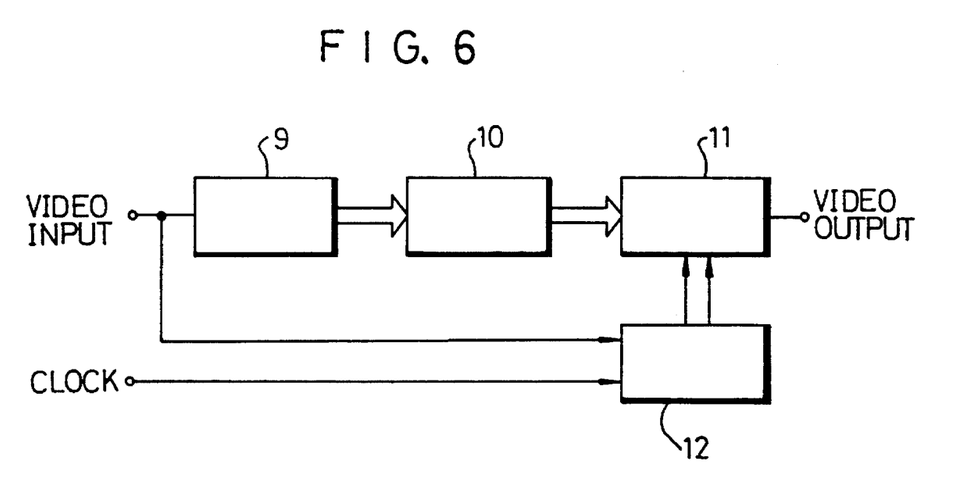
FIG. 6 is a schematic block diagram of a transient edge enhancer in the transient edge enhancing device of the present invention.

FIG. 6 is a schematic block diagram of each transient edge enhancer ENHNCR1 through ENHNCRn, which comprises image filtering section 9 for selecting a frequency band to be enhanced in an input video signal, image process outputting section 10 for receiving as an input signal a video signal filtered by image filtering section 9 and respectively outputting an enhanced video signal, an average video signal between adjacent pixels, and a normal video signal, transient edge and noise detecting section 12 for detecting transient edge and noise of input video signal and outputting a transient edge detection signal and a noise detection signal, and image output selecting section 11 for selecting and outputting one signal among the enhanced video signal, the average video signal between adjacent pixels, and the normal video signal outputted from image process outputting section 10, by being switch-controlled according to the transient edge detection signal and the noise detection signal.

The operation of the transient edge enhancer having the above construction is as follows.

In image filtering section 9, a frequency band to be enhanced is predetermined according to an inputted video signal. For example, the video signal is selectively filtered with respect to each edge region frequency band of S-VHS, TV or VCR signal. For example, in processing the S-VHS video signal, band-pass-filtering is performed to enable an enhancement process concentrated on frequency components of edge region (transient edge) in a video signal having a bandwidth of about 5 MHz.

The video signal outputted from image filtering means 9 is respectively outputted as an enhanced video signal if the signal region is a transient edge, as a video signal having an average value of adjacent pixels if it has a noise component, and as an original video signal in other cases (in normal region), by image process outputting means 10.

Among the video signals outputted as described above, only one video signal is selected and outputted by image output selecting section 11 controlled by an output of transient edge and noise detecting section 12. That is, transient edge and noise detecting section 12 detects a signal change region (rising and falling edges) in an input video signal to supply the detected result to image output selecting section 11, and also detects a noise in an input video signal to supply the detected result to image output selecting section 11.

Accordingly, image output selecting section 11 selects and outputs an enhanced video signal, a video signal having an average value of adjacent pixels, and an original video signal which is not enhanced, from the video signals outputted from image process outputting section 10 when the control signal outputted from transient edge and noise detecting section 12 represents a transient edge, a noise, and others, respectively.

The processed video signal whose transient edge is enhanced and noise removed, as described above, is outputted and then displayed on a color picture tube screen as an image having clear picture quality when selected by enhancer selecting means SW.

Figure 7A:
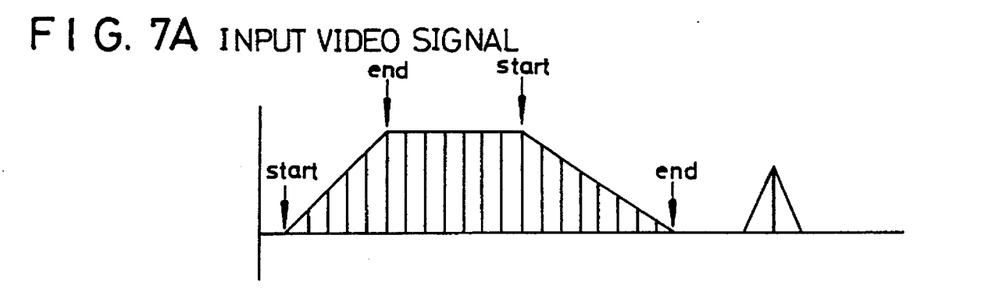
FIGS. 7A to 7E are waveform diagrams showing the transient edge enhancing steps according to the present invention.
Figure 7B:
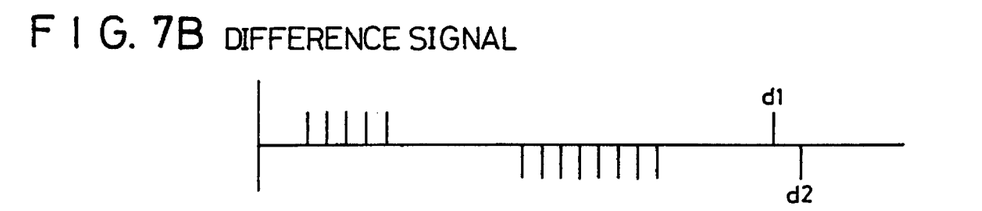
Figure 7C:
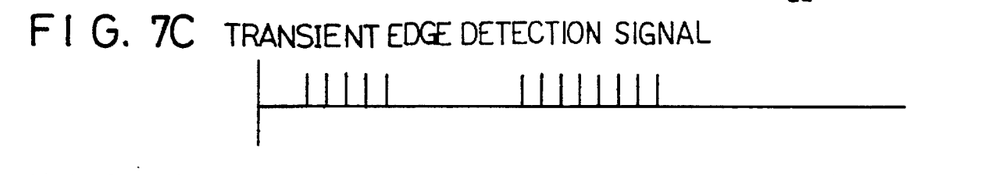
Figure 7D:
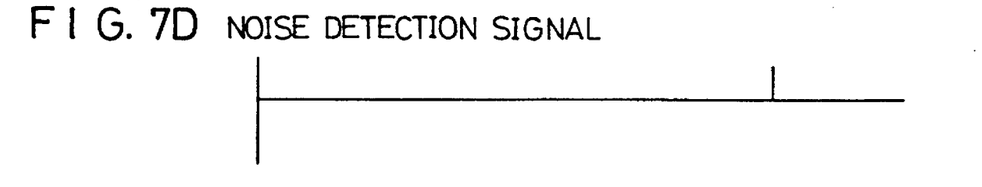
Figure 7E:
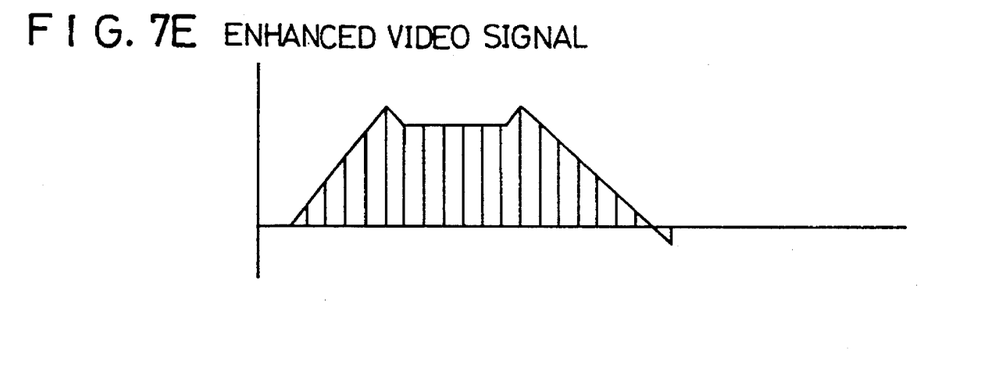

FIGS. 7A through 7E show the signal processing steps according to the operation of the present transient edge enhancer. A difference signal (x(n+1)−x(n)) between adjacent pixels as shown in FIG. 7B is obtained from an input video signal as shown in FIG. 7A. A transient edge detection signal such as FIG. 7C and a noise detection signal such as FIG. 7D are obtained from the difference signal. According to the existence or absence of the detected transient edge and noise, the enhancement (overshoot or undershoot) of the transient edge is performed at the transition ending or starting positions as described above, and the noise is also removed, thereby obtaining a video signal enhanced as shown in FIG. 7E. Here, in a transient edge detection signal of FIG. 7C, when the bandwidth of input video signal is narrow, for example, in case of a VCR signal, the filtering width of transient edge is set to be wide, and when the bandwidth is wide, for example, in case of an S-VHS signal, it is set to be narrow.

That is, referring to FIGS. 3 and 4, since a VCR signal having a narrow bandwidth has a wide width of transient edge, the detection width of transient edge is set to be wide, and since a S-VHS signal having a wide bandwidth has a narrow width of transient edge, the detection width of transient edge is set to be narrow, so that transient edge enhancement suitable for the respective video signal band characteristics is performed.

Figure 8A:
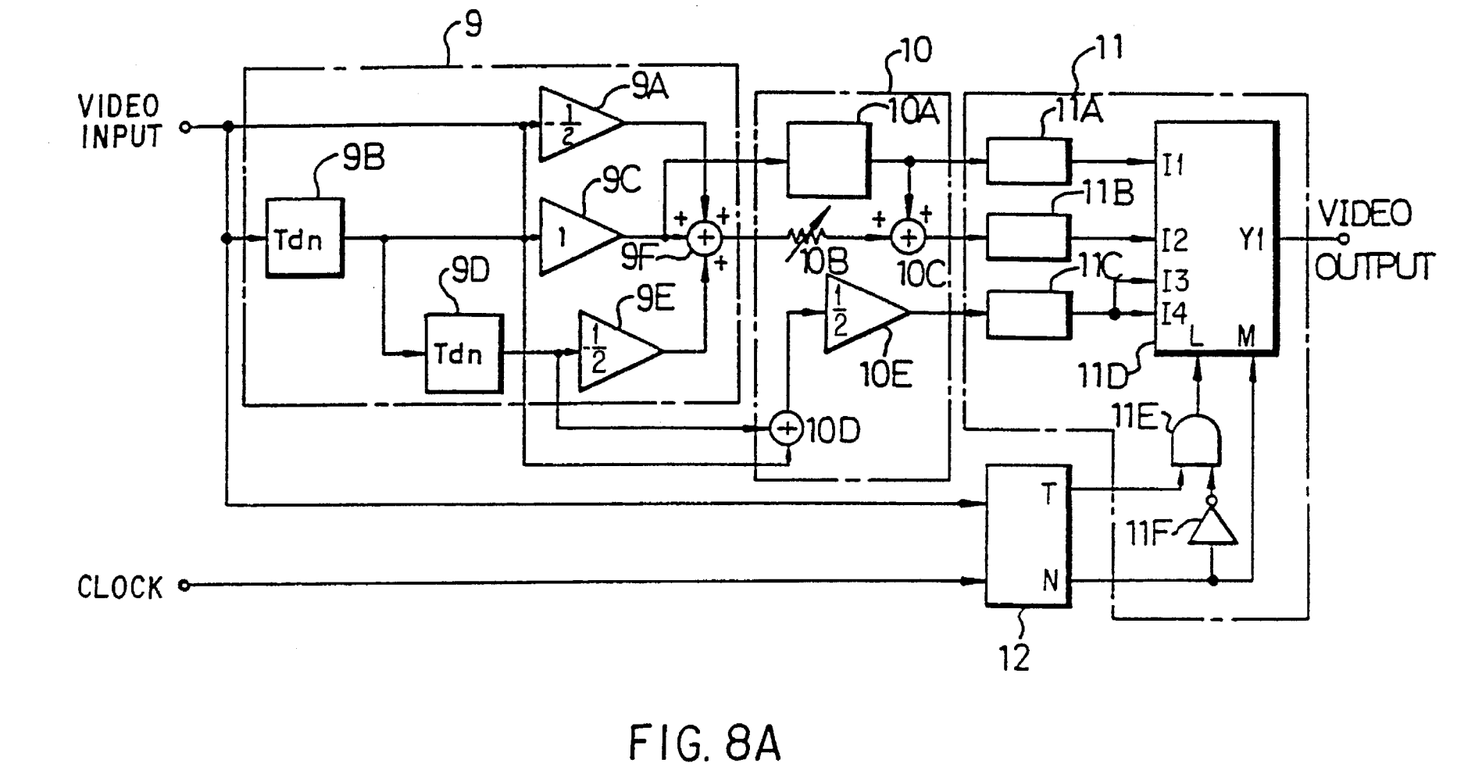
FIG. 8A is an embodied circuit diagram of a transient edge enhancer in the transient edge enhancing device of the present invention.

FIG. 8A shows an embodied circuit of a transient edge enhancer according to the present invention.

Image filtering section 9 comprises −½ amplifier 9A for inverting and ½-amplifying the input video signal, delay element 9B for delaying the input video signal for a predetermined time, buffer 9C for amplifying the video signal delayed by delay element 9B, delay element 9D for again delaying the video signal delayed by delay element 9B, −½ amplifier 9E for inverting and ½-amplifying the video signal supplied from delay element 9D, and adder 9F for adding the respective signals outputted from −½ amplifiers 9A and 9E and buffer 9C.

Image process outputting section 10 comprises delay matching element 10A for time-matching the video signal filtered by image filtering section 9, attenuator 10B for adjusting the enhanced level of the filtered video signal, adder 10C for adding the video signal time-matched by delay matching element 10A and the video signal adjusted by attenuator 10B and outputting the enhanced video signal, adder 10D for adding the double-delayed video signal outputted from delay element 9D in image filtering section 9 into an original video signal, and ½ amplifier 10E for ½-amplifying the output of adder 10D to output a video signal having an average value of adjacent pixels.

Image output selecting section 11 comprises delay matching elements 11A, 11B, and 11C for matching the delay levels of the normal video signal, the enhanced video signal, and the average video signal outputted from image process outputting section 10, multiplexer 11D for selecting and outputting one signal among the normal video signal, the enhanced video signal, and the average video signal passed through the respective matching elements, and AND gate 11E and inverter 11F for decoding the transient edge and noise detection signals T and N outputted from transient edge and noise detecting section 12 and supplying the decoded signals as switching control signals to control terminals L and M of multiplexer 11D.

The input video signal is delayed for a predetermined time Tdn through delay element 9B and is amplified by buffer 9C and then is supplied to adder 9F. Also, the input video signal is inverted and ½-amplified through −½ amplifier 9A and then is supplied to adder 9F, and the output video signal of delay element 9B is again delayed for a predetermined time Tdn through delay element 9D and is inverted and ½-amplified through −½ amplifier 9E, and then is supplied to adder 9F.

The delaying, amplifying, and adding operations are a signal process steps of band-pass filter, which filters in an input video signal luminance or chrominance signal corresponding to the width of transient edge according to its bandwidth. Here, the frequency band to be enhanced is set to be variable by adjusting the delay time Tdn. For example, with a system clock of 4 fsc(14.3 MHz), the delay time Tdn is properly set to be about 70 nsec with respect to an S-VHS input video signal, about 140 nsec with respect to an NTSC (TV) input video signal, and about 210 nsec with respect to a VCR input video signal.

The enhanced degree (level) of band-pass filtered video signal outputted from adder 9F is adjusted through attenuator 10B and then is supplied to adder 10C. Also, the video signal passed through delay element 9B and buffer 9C is time-matched in delay matching element 10A, is supplied to adder 10C, and is added to the video signal passed through attenuator 10B by adder 10C, so that a video signal having enhanced signal components in transient edge is outputted.

The enhanced video signal is timing-compensated with respect to the time delay occurring in the signal process step by delay matching element 11B, and is supplied to multiplexer 11D.

The double-delayed (2×Tdn) video signal (an output of delay element 9D) and the original input video signal are added by adder 10D, and the added value is again ½-amplified by ½ amplifier 10E, thereby outputting an averaged video signal, which is timing-compensated by delay matching element 11B as described above, and then is inputted in multiplexer 11D.

Also, the video signal passed through delay element 9B and buffer 9C is inputted as a normal original video signal to the multiplexer 11D via delay matching elements 10A and 11A.

The respective video signals inputted to multiplexer 11D as described above are selectively outputted according to control output of the transient edge and noise detecting section 12. That is, multiplexer 11D outputs an enhanced video signal, i.e., an output of delay matching element 11B, when the transient edge detection signal T outputted from transient edge and noise detecting section 12 is "high" (i.e., logic "1"), outputs an averaged video signal, i.e., an output of delay matching element 11C, when the noise detection signal N is "high", and outputs a delay-matched original video signal, i.e., an output of delay matching element 11A, when the transient edge detection signal T and the noise detection signal N are all "low" (i.e., logic "0"). As the transient edge detection signal T and the noise detection signal N are decoded through AND gate 11E and inverter 11F and are supplied to control terminals L and M of the multiplexer 11D as switching control signals, Y1 of multiplexer 11D is switched to I1 when M and L is 0 and 0, to I2 when M and L is 0 and 1, to I3 when M and L is 1 and 0, and to I4 when M and L is 1 and 1.

Figure 8B:
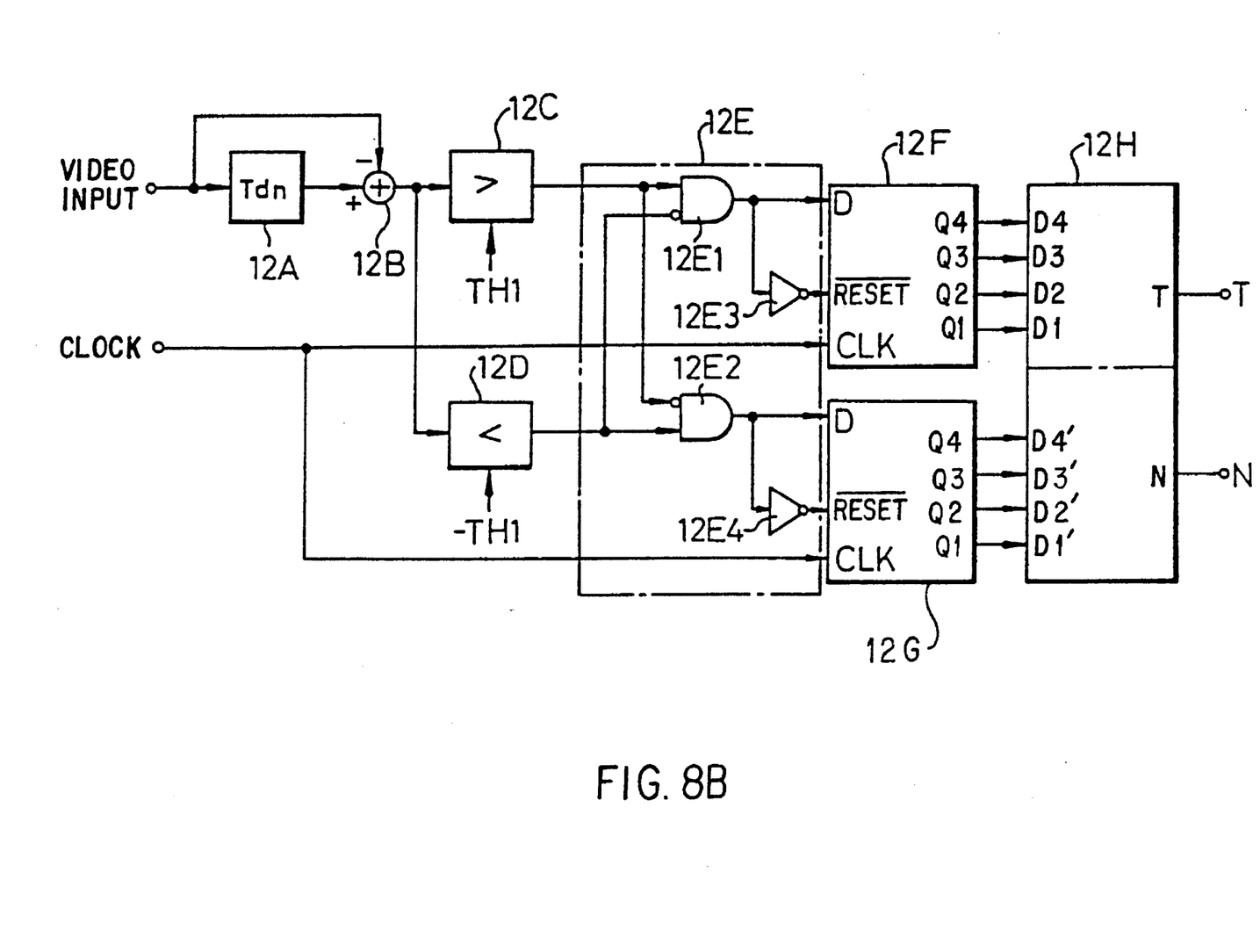
FIG. 8B is an embodied circuit diagram of transient edge and noise detecting section in the transient edge enhancing device of the present invention.

With reference to FIG. 8B, transient edge and noise detecting section 12 for controlling image output selecting section 11 as described above comprises delay element 12A for delaying an input video signal for a predetermined time Tdn, subtractor 12B for subtracting the input video signal from the video signal delayed by delay element 12A, thereby generating its difference signal, comparators 12C and 12D for comparing the difference signal outputted from subtractor 12B with the respective reference levels TH1 and −TH1, counter controller 12 for outputting difference signal data according to the outputs of comparators 12C and 12D, counters 12F and 12G for being reset by difference signal data outputted from counter controller 12E or counting the difference signal data, and transient edge/noise detecting logic section 12H for decoding the output values of counters 12F and 12G and detecting transient edge or noise.

The input video signal is delayed through delay element 12A for a predetermined time and a difference from the video signal before delay is produced in subtractor 12B. The produced difference signal (x(n+1)−x(n) as shown in FIG. 7B) is inputted to comparators 12C and 12D, respectively. Comparator 12C compares the inputted difference signal with the reference level TH1 and supplies difference signal data to rising transient edge counter 12F through AND gate 12E1 if the difference signal is larger than the reference level TH1, so that the output values Q4, Q3, Q2 and Q1 of counter 12F obtained by counting clocks CLK increase. At this time, a reset signal RESET is supplied to falling transient edge counter 12G through AND gate 12E2 and inverter 12E4, and counter 12G is reset. Meanwhile, comparator 12D compares the inputted difference signal with the reference level −TH1, and supplies difference signal data to falling transient edge counter 12G through AND gate 12E2 if the difference signal is smaller than the reference level −TH1, so that the output values Q4, Q3, Q2, and Q1 of counter 12G obtained by counting clocks increase. At this time, a reset signal RESET is supplied to rising transient edge counter 12F through AND gate 12E1 and inverter 12E3, thereby resetting counter 12F. The values counted as described above are supplied to transient edge/noise detecting logic section 12H as input data D4, D3, D2, D1, and D4', D3', D2', D1', and according to its decoded result, the transient edge detection signal T or the noise detection signal N is outputted from transient edge/noise detecting logic section 12H. Transient edge/noise detecting logic section 12H is composed of a transient edge detecting logic portion and a noise detecting logic portion, and decodes the respective input values.

Figure 9:
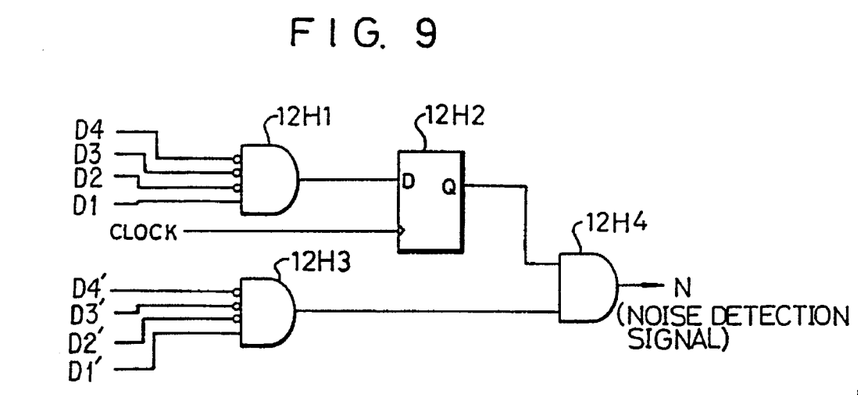
FIG. 9 is an embodied circuit diagram of a noise detecting logic section in the transient edge enhancer of the present invention.

FIG. 9 is a circuit diagram showing an embodiment of the noise detecting logic portion, in which noise detection signal N is composed of a logic, i.e., OR-gating of the one-clock-delayed rising transient edge count data D4, D3, D2, and D1, and the falling transient edge count data D4', D3', D2' and D1'. To do this, the logic portion comprises AND gates 12H1 and 12H3 and flip-flop 12H2 and AND gate 12H4.

If rising transient edge count data D4, D3, D2 and D1 is "0001", the output of AND gate 12H1 becomes logic "1", is one-clock-delayed through flip-flop 12H2 and is supplied to AND gate 12H4. At this time, if falling transient edge count data D4', D3', D2' and D1' is "0001", the output of AND gate 12H3 becomes logic "1" and is supplied to AND gate 12H4. In this case, noise detection signal N becomes logic "1". That is, between the difference signals d1 and d2 as shown in FIG. 7B, if the difference signal d1 is one-clock-delayed and inputted as "0001" and the difference signal d2 is "0001", it is determined as noise Meanwhile, FIGS. 10 through 12 show embodiments of transient edge detecting logic portions in transient edge/noise detecting logic section 12H shown in FIG. 8B, and are logic circuits for detecting transient edges with respect to S-VHS, TV and VCR signals.

Figure 10:
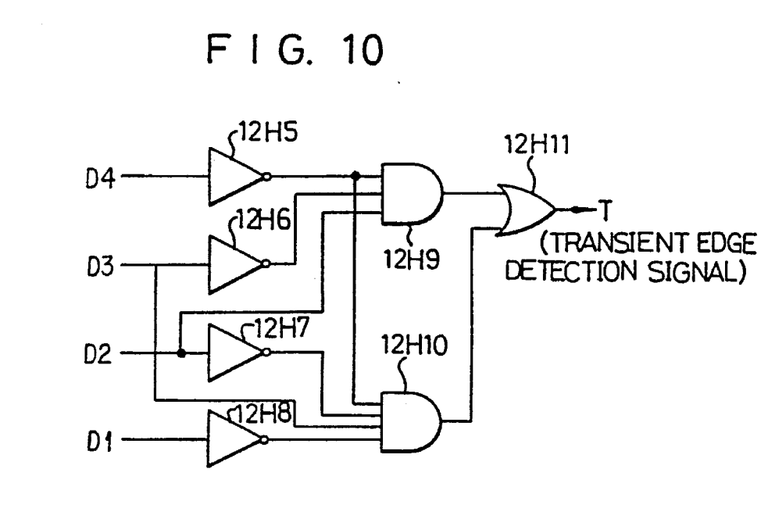
FIG. 10 is a circuit diagram showing a first embodiment of a transient edge detecting logic section in a transient edge enhancer of the present invention.

First, as shown in FIG. 10, in the transient edge detecting logic portion with respect to S-VHS signal, the transient edge detection signal T with respect to the rising transient edge count data D4, D3, D2 and D1 is constructed by a logic of $T=\overline{D4}D3D2\overline{D1}+ \overline{D4}D3D2D1+D4\overline{D3D2D1}= \overline{D4}D3D2(\overline{D1}+D1)+D4\overline{D3D2D1}=\overline{D4}D3D2+ D4\overline{D3D2D1}$. To do this, the logic portion comprises inverters 12H5, 12H6, 12H7, and 12H8 and AND gates 12H9 and 12H10 and OR gate 12H11. The same logic is constructed with respect to the falling transient edge count data D4', D3', D2' and D1'.

By the above transient edge detecting logic portion, when the count data D4D3D2D1 and D4'D3'D2'D1' are inputted as "0010", "0011", and "0100", the transient edge detection signal T becomes logic "1". Accordingly, in case of having clock frequency of 4 fsc(=14.3 MHz), the logic determines the signal of frequency region of 3.58 MHz through 7.16 MHz as an edge signal region and is suitable for processing the signal having a wide bandwidth such as S-VHS signal.

Figure 11:
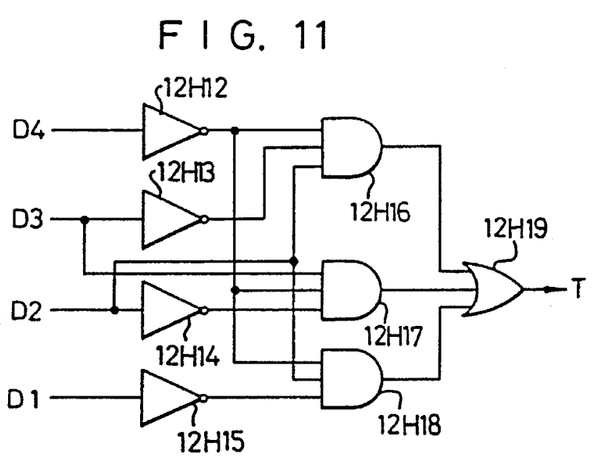
FIG. 11 is a circuit diagram showing a second embodiment of a transient edge detecting logic section in a transient edge enhancer of the present invention.
Figure 12:
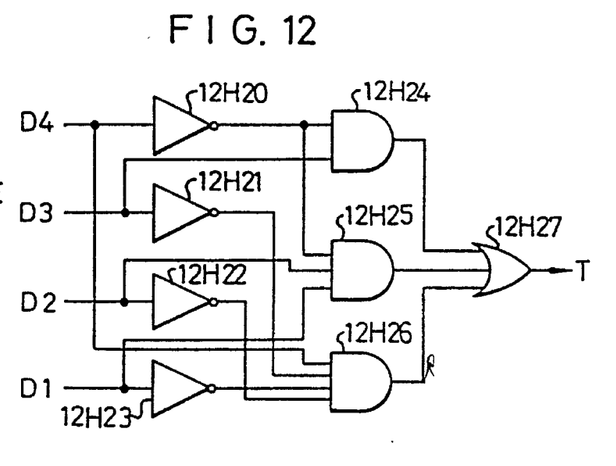
FIG. 12 is a circuit diagram showing a third embodiment of a transient edge detecting logic section in a transient edge enhancer of the present invention.

In the transient edge detecting logic portion with respect to TV (NTSC) signal, as shown in FIG. 11, the transient edge detection signal T with respect to the rising transient edge count data D4, D3, D2 and D1 is constructed by a logic of $T=\overline{D4}D3D2\overline{D1}+\overline{D4}D3D2D1+ \overline{D4D3}D2\overline{D1}+D4\overline{D3D2D1}+ \overline{D4}D3D2\overline{D1}=\overline{D4}D3D2\overline{D1}+\overline{D4}D3D2D1+ \overline{D4D3}D2\overline{D1}+ \overline{D4}D3D2\overline{D1}+\overline{D4D3}D2D1+D4\overline{D3D2D1}= \overline{D4}D3D2 (\overline{D1}+ D1)+\overline{D4D3}D2 (\overline{D1}+D1)+ \overline{D4D2}\overline{D1} (D3+\overline{D3})=\overline{D4}D3D2+ \overline{D4D3}D2+ \overline{D4D2D1}$. To do this, the logic portion comprises inverters 12H12, 12H13, 12H14, and 12H15 and AND gates 12H16 and 12H17 and 12H18 and OR gate 12H19. The same logic is constructed with respect to the falling transient edge count data D4', D3', D2' and D1'.

By the above transient edge detecting logic portion, when the count data D4D3D2D1 and D4'D3'D2'D1' are inputted as "0010", "0011", "0100", "0101" and "0110", the transient edge detection signal T becomes logic "1", thereby being detected as a transient edge. Accordingly, this logic portion is suitable for the TV(NTSC) signal processing.

In the transient edge detecting logic portion with respect to a VCR signal as shown in FIG. 12, the transient edge detection signal T with respect to the rising transient edge count data D4, D3, D2 and D1 is constructed by a logic of T=$\overline{D4}\overline{D3}D2D1+\overline{D4}D3\overline{D2}\overline{D1}+$ $\overline{D4}D3\overline{D2}D1+\overline{D4}D3D2\overline{D1}+$ $\overline{D4}D3D2D1+D4\overline{D3}\overline{D2}\overline{D1}=$ $\overline{D4}D2D1$ $(\overline{D3}+D3)+\overline{D4}D3$ $(\overline{D2}\overline{D1}+$ $\overline{D2}D1+D2\overline{D1})=\overline{D4}D3+\overline{D4}D2D1+D4\overline{D3}\overline{D2}\overline{D1}$. To do this, the logic portion comprises inverters 12H20, 12H21, 12H22, and 12H23 and AND gates 12H24 and 12H25 and 12H26 and an OR gate 12H27. The same logic is constructed with respect to the falling transient edge count data D4', D3', D2' and D1'.

By the above transient edge detecting logic portion, when the count data D4D3D2D1 and D4'D3'D2'D1' are inputted as "0011", "0100", "0101", "0110", "0111" and "1000", the transient edge detection signal T becomes logic "1", thereby being detected as a transient edge. Accordingly, this logic portion is suitable for processing the signal having a narrow bandwidth such as VCR signal.

Figure 13:
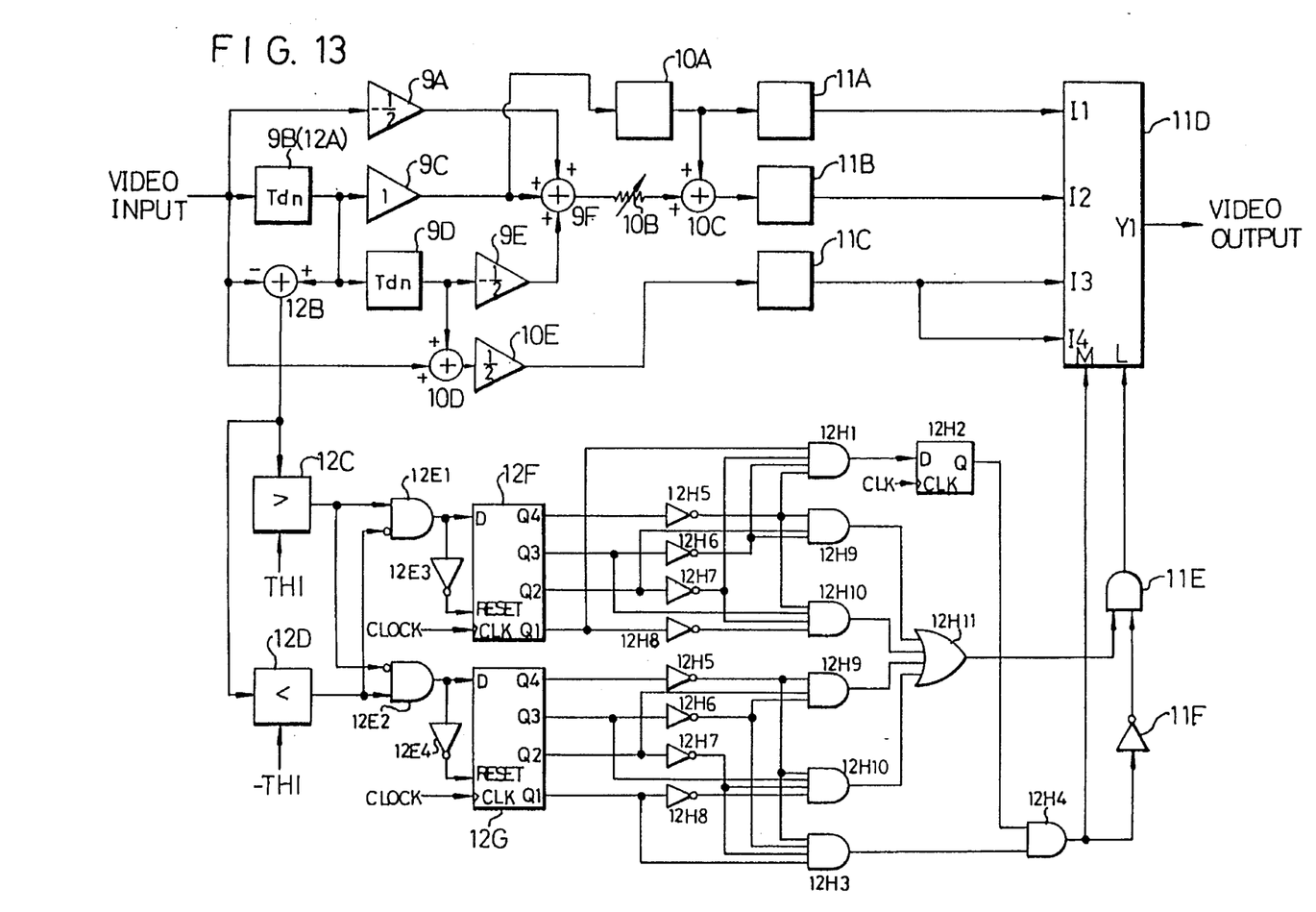
FIG. 13 is a circuit diagram showing a first embodiment of a transient edge enhancer according to the present invention.

FIG. 13 is a circuit diagram showing a first embodiment of the transient edge enhancer applied in the S-VHS video signal. The operation is the same as the circuit operation in FIGS. 8A, 8B, 9 and 10.

That is, a band-pass filtering signal process is performed by delay elements 9B and 9D, amplifiers 9A and 9E, buffer 9C, and adder 9F for the inputted video signal, whose enhanced level is adjusted by attenuator 10B. The level-adjusted signal becomes a video signal having an enhanced transient edge through delay matching element 10A and adder 10c. The enhanced video signal is timing-matched by delay matching element 11B, and then is inputted to multiplexer 11D. Also, the video signal outputted from delay matching element 10A is timing-matched by delay matching element 11B and is inputted to multiplexer 11D. And, the video signal having an average value between adjacent pixels through the adder 10D and ½ amplifier 10E is timing-matched by delay matching element 11C, and then is supplied to multiplexer 11D.

Meanwhile, a difference signal of video signal is outputted by delay element 12A and adder 12B, and is compared with the respective reference levels TH1 and −TH1 by comparators 12C ad 12D. According to the compared result, respective counters 12F and 12G perform data count of rising transient edge or falling transient edge.

Counters 12F and 12G output noise detection signal N according to the decoded result of AND gates 12H1 and 12H3, flip-flop 12H2, and AND gate 12H4, and on other hand, outputs transient edge detection signal T according to the decoded result of inverters 12H5 and 12H8, AND gates 12H9 and 12H10, and OR gate 12H11. Transient edge detection signal T and noise detection signal N are supplied to control terminals L and M of multiplexer 11D via the decoding logic of AND gate 11E and inverter 11F. According to the control signal, multiplexer 11D selectively outputs one among respective video signals supplied to input terminals I1, I2, I3, and I4.

Figure 14:
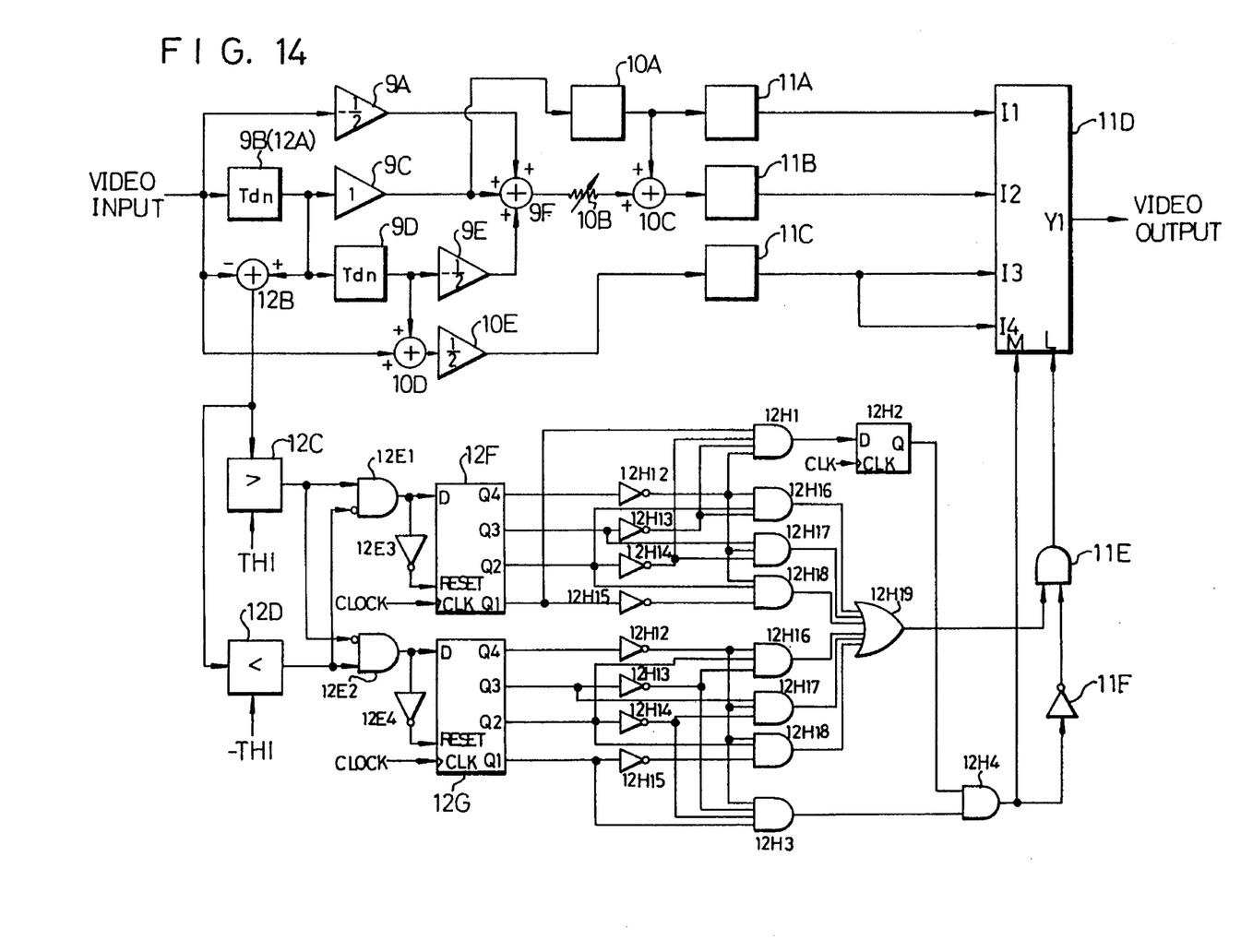
FIG. 14 is a circuit diagram showing a second embodiment of a transient edge enhancer according to the present invention.

FIG. 14 is a circuit diagram showing a second embodiment of the transient edge enhancer applied in the TV(NTSC) video signal. The operation is the same as the circuit operation in FIGS. 8A, 8B, 9 and 11.

That is, the operation of the same constructional elements as the circuit construction of FIG. 13 is the same as described above, and the delay period of delay elements 9B and 9D and the transient edge detection for output data of counters 12F and 12G, by inverters 12H12 through 12H15, AND gates 12H16, 12H17, and 12H18, and OR gate 12H19 are obtained suitably for a TV signal.

Figure 15:
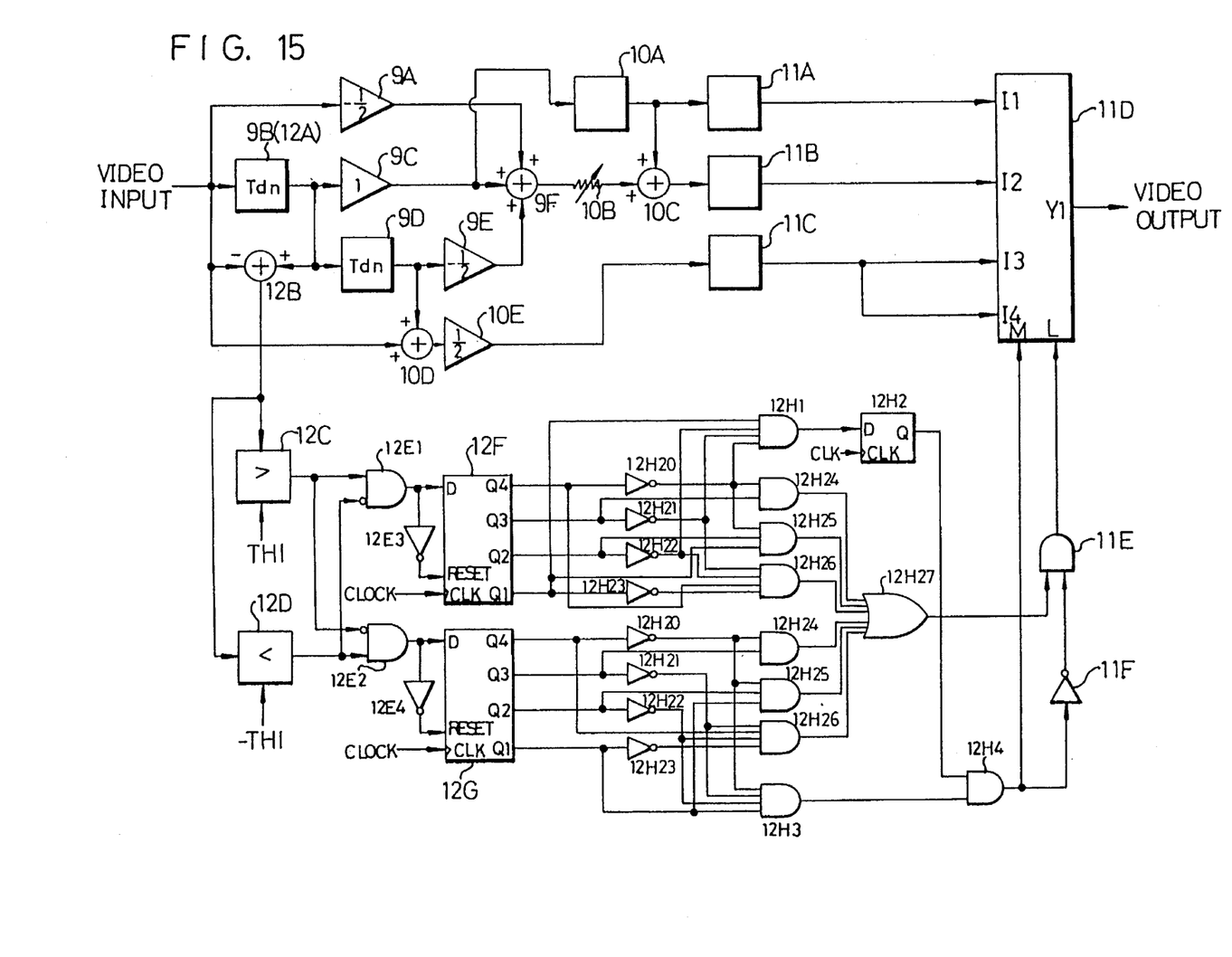
FIG. 15 is a circuit diagram showing a third embodiment of a transient edge enhancer according to the present invention.

FIG. 15 is a circuit diagram showing a third embodiment of the transient edge enhancer applied in the VCR video signal. The operation is the same as the circuit operation in FIGS. 8A, 8B, 9 and 12.

That is, the operation of the same constructional elements as the circuit construction of FIG. 13 is the same as described above, and the delay period of delay elements 9B and 9D and the transient edge detection for output data of counters 12F and 12G, by inverters 12H20 through 12H23, AND gates 12H24, 12H25, and 12H26, and OR gate 12H27 are obtained suitably for a VCR signal.

As described above, according to the present invention, an optimal transient edge enhancing is performed according to the frequency band of transient edge of each input video signal, so that an image of high definition can be displayed and there is also the advantage of excluding the enhancement process for noise region. Also, contrarily to a conventional device, the transient edge can be detected, thereby accurately enhancing the transient edge to improve reliability of the device. Also, the width of transient edge is adjustable and the enhancement process is not performed for the sharp transient edge, thereby providing an image enhanced with the optimum condition for human visual characteristics.

While the present invention has been described in particular relation to the drawings attached hereto, it should be understood that other and further modifications, apart from those shown or suggested herein, may be made within the spirit and scope of this invention.

What is claimed is:

1. A video signal transient edge enhancing device for an image processing system comprising:

at least two independent transient edge enhancers for performing band enhancement of transition starting and ending positions of each input video signal by each proper bandwidth with respect to said input video signals having different frequency bands to be enhanced;

selection control signal generating means for generating a selection control signal determined according to bands of said input video signals, said selection control signal generating means including a mode selection switch or a system controller; and enhancer selecting means for selecting one enhancer among said transient edge enhancers by being switch-controlled according to said selection control signal outputted from said selection control signal generating means and outputting a video signal enhanced by said selected enhancer, where said output video signal corresponds to a single selection control signal.

2. A video signal transient edge enhancing device for an image processing system as claimed in claim 1, wherein each of said transient edge enhancers comprises:

image filtering means for selecting from each input video signal a frequency band to be enhanced;

image process outputting means for receiving a video signal filtered by said image filtering means and outputting an enhanced video signal, an average video signal between adjacent pixels, and a normal video signal, respectively;

transient edge and noise detecting means for detecting a transient edge and noise of said input video signal and outputting a transient edge detection signal and a noise detection signal; and image output selecting means for selecting and outputting one signal among said enhanced video signal, said average video signal between adjacent pixels, and said normal video signal outputted from said video process outputting means by being switch-controlled according to said transient edge detection signal and said noise detection signal outputted from said transient edge and noise detecting means.

3. A video signal transient edge enhancing device for an image processing system as claimed in claim 2, wherein said image process outputting means comprises:

a delay matching element for time-matching said filtered video signal;

an attenuator for adjusting an enhanced level of said filtered video signal;

a first adder for outputting an enhanced video signal by adding a video signal delay-matched by said delay matching element into a video signal adjusted by said attenuator;

a second adder for adding a video signal double-delayed by said image filtering means to an original video signal; and a ½ amplifier for ½-amplifying an output of said second adder to output a video signal having an average value between adjacent pixels.

4. A video signal transient edge enhancing device for an image processing system as claimed in claim 2, wherein said image output selecting means comprises:

three delay matching elements for matching delay levels of said normal video signal, said enhanced video signal, and said average video signal outputted from said image process outputting means;

a multiplexer for selecting and outputting one signal among said normal video signal, said enhanced video signal, and said average video signal passed through said respective matching elements; and an AND gate and an inverter for decoding said transient edge detection signal and said noise detection signal outputted from said transient edge and noise detecting means and supplying said decoded signals as a switching control signal of said multiplexer.

5. A video signal transient edge enhancing device for an image processing system as claimed in claim 2, wherein said transient edge and noise detecting means comprises:

a delay element for delaying said input video signal for a predetermined time;

a subtractor for subtracting said input video signal from a video signal delayed by said delay element and outputting a difference signal;

two comparators for comparing said difference signal supplied from said subtractor with two reference levels;

a counter controller for outputting difference signal data according to outputs of said two comparators;

a rising and falling transient edge counter for being reset by said difference signal data outputted from said counter controller or counting said difference signal data; and a transient edge/noise detecting logic circuit for detecting whether there is a transient edge or a noise by decoding an output value of said counter.

6. A video signal transient edge enhancing device for an image processing system as claimed in claim 5, wherein said transient edge/noise detecting logic circuit, comprises a transient edge detecting logic portion in which a transient edge detection signal T is composed of a logic, $T=\overline{D4}D3D2+ \overline{D4D3D2D1}$, with respect to rising transient edge or falling transient edge count data D4, D3, D2 and D1.

7. A video signal transient edge enhancing device for an image processing system as claimed in claim 5, wherein said transient edge/noise detecting logic circuit comprises a transient edge detecting logic portion in which a transient edge detection signal T is composed of a logic, $T=\overline{D4}D3D2+ \overline{D4D3}\,\overline{D2}+\overline{D4D2}\,\overline{D1}$, with respect to rising transient edge or falling transient edge count data D4, D3, D2, and D1.

8. A video signal transient edge enhancing device for an image processing system as claimed in claim 5, wherein said transient edge/noise detecting logic circuit comprises a transient edge detecting logic portion in which a transient edge detection signal is composed of a logic, $T=\overline{D4}D3+ \overline{D4}D2D1+\overline{D4D3D2D1}$, with respect to rising transient edge or falling transient edge count data D4, D3, D2 and D1.

9. A video signal transient edge enhancing device for an image processing system as claimed in claim 5, wherein said transient edge/noise detecting logic circuit comprises a noise detecting logic portion in which a noise detection signal is composed of logic for OR-gating 1-clock-delayed rising transient edge count data and falling transient edge count data.

10. A video signal transient edge enhancing device for an image processing system as claimed in claim 9, wherein said predetermined delay time in said delay element is 70 nsec with respect to a system clock of 4 fsc(=14.3 MHz).

11. A video signal transient edge enhancing device for an image processing system as claimed in claim 9, wherein said predetermined delay time in said delay element is 140 nsec with respect to a system clock of 4 fsc(=14.3 MHz).

12. A video signal transient edge enhancing device for an image processing system as claimed in claim 9, wherein said predetermined delay time in said delay element is 210 nsec with respect to a system clock of 4 fsc(=14.3 MHz).

13. A video signal transient edge enhancing method for an image processing system comprising the steps of:

a) band-pass-filtering respective corresponding frequency bands with respect to a plurality of input video signals having different frequency bands whose transient edges will be enhanced;

b) detecting rising and falling transient edges, a noise region, and a normal video signal region within each filtered video signal;

c) selectively outputting a video signal whose rising and falling edges are enhanced in rising and falling transient edges of each video signal, an average video signal of two adjacent pixels in a noise region, and an original video signal in a normal signal region, using the respective detected edges and regions as region detection information; and d) selectively outputting one signal among the video signals enhanced by the respective steps according to bands of the respective input video signals.

* * * * *